United States Patent Office 3,232,764
Patented Feb. 1, 1966

3,232,764
GELATIN COMPOSITIONS ADAPTED FOR THE PREPARATION OF HARDENED COATINGS
Charles F. H. Allen and Donald M. Burness, both of Rochester, N.Y., assignors to Eastman Kodak Company, Rochester, N.Y., a corporation of New Jersey
No Drawing. Filed May 25, 1965, Ser. No. 458,760
11 Claims. (Cl. 96—111)

This application is a continuation-in-part of applications Serial Nos. 556,031, filed December 29, 1955; 18,-471, filed March 30, 1960; and 389,773, filed August 14, 1964, all now abandoned.

This invention relates to photographic gelatin coating compositions, that is of gelatin having a jelly strength of at least 150 g. bloom, containing therein an aliphatic dialdehyde, the aldehyde groups of which are separated by a linear carbon chain of 2–3 carbon atoms, as the hardener, and the coatings which result therefrom. The carbon chain of the dialdehyde has no more than three substituents other than hydrogen, which substituents are no other than alkyl or alkoxy groups containing 1–4 carbon atoms.

Some aldehydes have been mentioned previously as useful for the hardening of gelatin coatings. Probably the most widely mentioned material of this type is formaldehyde which is extremely active as a hardening agent. This material, however, often exhibits undesirable photographic properties and, in addition, may be toxic in certain situations. Formaldehyde may have an undesirable effect upon certain types of photographic emulsions. Glyoxal has been mentioned as a hardener for gelatin when incorporated therein. Glyoxal, however, is not as effective ordinarily as formaldehyde for hardening purposes and, in addition, has poor keeping properties. Various other hardening agents have been mentioned, but up to the present time, the search continues for hardening agents free of those properties which have characterized previous hardeners heretofore to their detriment.

One object of our invention is to provide gelatin coatings and compositions to supply the same, containing an aliphatic dialdehyde in which the dialdehyde groups are separated by a linear chain of 2–3 carbon atoms. Another object of our invention is to provide aqueous gelatin compositions from which hardened coatings may be obtained. A further object of our invention is to provide gelatin photographic emulsions, the properties of which are not adversely affected by the hardener which is used therein. Other objects of our invention will appear herein.

We have found that aqueous solutions of gelatin of at least 150 g. bloom, jelly strength, to which have been added dialdehydes, e.g. to silver-halide gelatin emulsions as described herein, give coatings having excellent resistance to the effect of hot water as used in testing the hardness of gelatin coatings, which coatings moreover, when used for photographic purposes, are free of undesirable effects such as have been encountered with many previous hardeners for gelatin. The dialdehydes which have been found to be useful as hardeners in gelatin compositions in accordance with our invention are dialdehydes, the aldehyde groups of which are separated by a linear chain of 2–3 carbon atoms, which carbon chain has no more than three substituents thereon other than hydrogen, the substituents when present being no other than alkyl of 1–4 carbon atoms and alkoxy of 1–4 carbon atoms.

In those cases where the dialdehyde is present in the gelatin composition in the form of its bisulfite addition product, it does not exert maximum hardening effect until converted to free aldehyde form such as by an alkaline solution such as used in photographic processing in an alkaline developer of the product containing the gelatin and the aldehyde compound. Compositions of gelatin of at least 150 g. bloom jelly strength, and dialdehyde bisulfite addition products are included within the scope of the invention, even though alkaline treatment is often desirable to free the aldehyde therein.

Although the said dialdehydes when present in gelatin have a hardening effect on a coating thereof applied to a support, it is desirable for the most effective hardening that the gelatin contain at least 0.5% of the hardener (based on the weight of the gelatin). We have found that ordinarily the dialdehyde gives maximum hardening of the gelatin when present in amounts not over 3%, based on the weight of the gelatin, but greater proportions such as 10%, 15% or even 25% or more can be used.

The degree of hardening is conveniently determined from the melting point of the gelatin layer in contact with an aqueous bath at an elevated temperature. For instance, the melting point in contact with water of an unhardened layer of gelatin of at least 150 g. bloom, jelly strength, is commonly within the range of 30–35° C., whereas gelatin coatings containing dialdehydes as described generally exhibit melting points, in contact with water, greater than 97° C.

Some dialdehydes which are useful, when contained in gelatin of at least 150 g. bloom jelly strength, for hardening layers of coatings thereof are: beta-methyl glutaraldehyde, glutaraldehyde, alpha-methyl glutaraldehyde, maleic dialdehyde, succinic dialdehyde, methoxy succinic dialdehyde, alpha-alpha-dimethyl glutaraldehyde, methyl maleic dialdehyde, methyl succinic dialdehyde, alpha-methyl - beta - ethoxy glutaraldehyde, alpha - n - butoxy glutaradehyde, alpha-ethyl-beta-ethoxy glutaraldehyde, beta-n-butoxy glutaraldehyde, alpha-alpha-dimethoxy succinic dialdehyde, beta-isopropoxy succinic dialdehyde, alpha-alpha-diethyl succinic dialdehyde, and butyl maleic dialdehyde. Gelatin hardened with these compounds is relatively free of excessive surface hardening and reticulation is less pronounced than when hardened with formaldehyde.

The following examples illustrate the use of dialdehydes for hardening gelatin in accordance with our invention.

*Example 1*

Gelatin solutions (jelly strength 150 g. bloom) of approximately 5% concentration were prepared. To one solution was added 0.25% formaldehyde and to three others 0.25%, 0.47% and 0.94% of beta-methyl glutaraldehyde was added respectively, the percentages being based on the weight of the gelatin. The solutions were coated out to form several coating samples. The coatings were aged for 3 hours, 22.5 hours and 21 days and were tested for melting points and percentages of swelling. The values obtained were as follows:

| Hardener (percent on wt. of gelatin) | Melting point, °C., with age of coating | | | Percent swelling with age of coating | | |
|---|---|---|---|---|---|---|
| | Hours | | 21 days | Hours | | 21 days |
| | 3 | 22.5 | | 3 | 22.5 | |
| 0.25% formaldehyde | 39 | 96 | 97 | 259 | 336 | 263 |
| 0.25% beta-methyl glutaraldehyde | 37 | 40 | 61 | 554 | 496 | 461 |
| 0.47% beta-methyl glutaraldehyde | 71 | 95 | 97 | 442 | 390 | 359 |
| 0.94% beta-methyl glutaraldehyde | 95 | 97 | 97 | 420 | 331 | 341 |

Example 2

A solution comprising 7 grams of photographic gelatin, having a jelly strength of at least 150 g. bloom, in 100 cc. of water was divided into 2 equal portions. 0.5% (based on the weight of the gelatin) of maleic dialdehyde was added to one portion. The two portions were then coated separately on subbed glass plates, which coatings were conditioned for four months at 77° F. 50% R.H. The plates were then immersed in water at 68° F. and the temperature of the water was gradually increased to the boiling point. The gelatin coating containing no hardener melted from the glass plate at about 94° F. The gelatin coating containing the maleic dialdehyde remained firm and free of reticulation up to the water boiling point, 212° F.

Example 3

To separate portions of an optically sensitized negative-speed gelatin-silver bromoiodide photographic emulsion, the gelatin of which has a jelly strength of at least 150 g. bloom, were added in parts per hundred, of the weight of the photographic gelatin, respectively 2 parts succinic dialdehyde, .86 part maleic dialdehyde, 1.2 parts methoxy succinic dialdehyde. The emulsions were then coated on subbed cellulose acetate film support and the coatings were dried and were exposed. The coatings were developed for 5 minutes in Kodak DK–50 developer. When tested for hardening by the melting point method described in Example 2, the control containing no hardener melted at 92° F. The three film samples containing hardener resisted melting to the boiling point, 212° F.

Example 4

A positive speed unsensitized gelatin-silver chlorobromide photographic emulsion, the gelatin of which has a jelly strength of at least 150 g. bloom, was divided in three parts. To two of these were added respectively 2.87% succinic dialdehyde and 1% of maleic dialdehyde based on the weight of the gelatin. The three emulsion samples were coated onto a film base and the coatings were dried. The dried coatings were exposed for 1/25 second on an Eastman Ib sensitometer through a step wedge negative and were developed for four minutes in Kodak D19 developer. In the melting point test described in Example 2, the control coating melted at 107° F. The two coatings containing the dialdehyde hardeners showed no signs of reticulation and were still firmly adherent to the support when the temperature reached 212° F.

Example 5

To separate portions of a high sped negative silver-halide gelatin emulsion, the gelatin of which has a jelly strength of at least 150 g. bloom, at pH 6 were added 1% (by weight of the gelatin) of malonaldehyde, 1% beta-methyl glutaraldehyde and 1% of adipic aldehyde specifically, malonaldehyde and adipic aldehyde being examples of aldehydes outside of the invention. The separate samples were coated on subbed film base and conditioned for 18 hours at 50% relative humidity. When tested for hardening by the melting point procedure described in Example 2, the malonaldehyde melted at 52° C., the beta-methyl glutaraldehyde coating was still firmly adherent at the boiling point, 100° C., and the adipic aldehyde melted at 36° C.

Example 6

To separate portions of a gelatin-silver bromoiodide photographic emulsion, the gelatin of which has a jelly strength of at least 150 g. bloom, which emulsion contained 128 g. of gelatin per mole of silver, and a magenta dye-forming coupler dispersed in a high boiling solvent was added maleic dialdehyde at the concentrations listed below:

G.
Maleic aldehyde per mole of Ag _____ 167
Maleic aldehyde per mole of Ag _____ 334
Maleic aldehyde per mole of Ag _____ 668

These portions were coated on separate film supports and were tested for hardness by immersing in hot water. Each emulsion coating was found to be resistant to melting by hot water.

Example 7

The procedure of the preceding example was repeated except that succinaldehyde was employed as the hardener in the emulsion composition. Each of the emulsion coatings was found to be resistant to melting by hot water.

Example 8

Succinaldehyde-bis-sodium bisulfite addition product is useful as a delayed hardener in gelatin compositions, no appreciable hardening occurring until the coated material is treated with an alkaline solution.

Portions of a gelatin-silver bromoiodide emulsion, the gelatin of which had a jelly strength of 150 g. bloom, were mixed with the indicated amounts of succinaldehyde-bis-sodium bisulfite addition product and the emulsions were coated on cellulose acetate supports. Samples of each coating were exposed on an Eastman Ib sensitometer, processed in Kodak Developer DK–50, fixed, washed and dried. The results obtained in testing the various emulsion coatings were as follows:

| | Percent of hardener based on wt. of gelatin | Relative speed | Gamma | Fog |
|---|---|---|---|---|
| No succinaldehyde sodium bisulfite | | 132 | 1.38 | .12 |
| Succinaldehyde sodium bisulfite | 2.0 | 138 | 1.37 | .14 |
| Do | 10.0 | 138 | 1.60 | .15 |

The coatings without alkaline processing or treatment melt in 86° F. water. A set of samples of the coatings were immersed in an aqueous alkaline bath and were tested for melting by immersing in water, the temperature of which was progressively raised. The sample containing no succinaldehyde sodium bisulfite melted at 86° F. Those containing succinaldehyde sodium bisulfite withstood melting up to the boiling temperature of the water.

Example 9

The preceding example was repeated except that glutaraldehyde-bis-bisulfite addition product was used instead of the succinaldehyde compound. The glutaraldehyde bis-bisulfite product showed properties similar to those of the succinaldehyde compound except that some hardening effect was exhibited even before the bathing in alkali took place. The alkaline treatment however considerably increased the amount of hardening. The following data show the results obtained upon testing the coatings after processing using alkaline developer:

| | Percent based on weight of gelatin | Rel. speed | Gamma | Fog | Melting points, °F. | |
|---|---|---|---|---|---|---|
| | | | | | Before bathing | After bathing |
| No glutaraldehyde bisulfite compound | | 100 | 1.23 | .13 | 85 | 94 |
| Glutaraldehyde bisulfite addition product | 2.1 | 120 | 11.18 | .13 | 99 | 148 |
| Do | 4.2 | 123 | 1.18 | .11 | 159 | 212 |

*Example 10*

The invention includes both the use of dialdehyde and the use of bisulfite addition products thereof as hardening agents and the latter is not confined to only the alkali metal bisulfite addition products.

The preceding example was repeated except that addition products with glutaraldehyde of alkaline earth metal bisulfites and organic bisulfites were used in the proportions designated and their hardening effects were compared with layers of like composition in which no hardener was used.

The following data show the results obtained upon testing the coatings after processing using alkaline developer:

| Hardener | Concentration of hardener (g./100 g. gelatin) | Percent swell in water |
|---|---|---|
| No glutaraldehyde bisulfite compound | | 500 |
| Glutaraldehyde bis(calcium bisulfite) | 3.0 | 460 |
| Do | 6.0 | 360 |
| Glutaraldehyde bis(trimethyl benzyl ammonium bisulfite) | 3.0 | 460 |
| Do | 6.0 | 390 |
| Succinaldehyde bis(trimethyl benzyl ammonium bisulfite) | 3.0 | 460 |
| Do | 6.0 | 210 |

The hardening agents which I have listed may be used in various kinds of photographic emulsions. In addition to being useful in nonsensitized emulsions, these hardeners are also adapted for use in orthochromatic, panchromatic and X-ray emulsions. If used with sensitizing dyes, they may be added to the emulsion either before or after the addition of the dye. Various silver salts may be used as the photosensitive salt such as silver bromide, silver iodide, silver chloride or mixed silver halides. The dialdehyde hardening agents may be used in emulsions intended for color photography; for example, emulsions containing color-forming couplers or emulsions to be developed by solutions containing couplers. It is to be understood that emulsions to which other addenda have been supplied, such as stabilizers, sensitizers or the like, are as a rule susceptible to hardening with dialdehydes as described.

*Example 11*

An unhardened gelatin layer containing glutaraldehyde bis-sodium bisulfite is coated on a paper support at a coverage of 220 mg. of gelatin/ft.$^2$ and 49 mg. of glutaraldehyde bis-sodium bisulfite/ft.$^2$. Over the gelatin layer is coated a silver bromoiodide gelatin emulsion at a coverage of 58 mg. of gelatin and 72 mg. of silver/ft.$^2$. The coating is exposed on a sensitometer and processed for 20 sec. in Kodak Developer D–72 (1:1). Before processing the melting point of the gelatin layers is 102° F. and after processing the melting point is greater than 134° F. The melting point is measured by immersing the sample in water which is being heated at the rate of 6° F./min. and brushing the emulsion surface with a soft bristle brush. The temperature at which there is evidence of emulsion removal is taken as the melting point.

*Example 12*

An unhardened silver bromoiodide gelatin emulsion containing incorporated developing agents and glutaraldehyde bis-sodium bisulfite is coated on a paper support at the following coverages/ft.$^2$: 145 mg. silver, 270 mg. gelatin, 88 mg. hydroquinone, 18 mg. 1-phenyl-3-pyrazolidone and 77 mg. glutaraldehyde bis-sodium bisulfite. The coating is exposed on a sensitometer and processed in an alkaline activator at pH 10.5, containing no developing agents. The unprocessed coating has a melting point of 100° F., and the processed coating has a melting point greater than 135° F.

A convenient method for preparing succinaldehyde for use in hardening photographic gelatin is by hydrolyzing 2,5-diethoxytetrahydrofuran accompanied by refluxing in the presence of acetic acid or the like. Where the purity of product is important it may be desirable to first refine the diethoxytetrahydrofuran such as by dissolving it in a petroleum distillate (such as hexane) and treating with activated alumina. As an example of a procedure by which succinaldehyde may be prepared, a mixture of 600 parts of 2,5-diethoxytetrahydrofuran, 300 parts of distilled water, 1 part of acetic acid and 0.5 part of hydroquinone was heated under a slow stream of nitrogen, the alcohol-water azeotrope being removed continuously through a 12-inch column packed with 3/16 inch helices, fitted with a variable reflux head. Regulating the rate of takeoff to maintain a distillate temperature of less than 80° C., the pot temperature reached a temperature of 101° C. after 3½ hours when reaction is considered complete. To recover the succinaldehyde, the mass is cooled, the water is removed by azeotropic distillation using benzene, the benzene is then boiled off and the product is recovered by distillation into a well-cooled receiver. The succinaldehyde is dissolved in water or other solvent to inhibit polymerization of the succinaldehyde.

The invention has been described in considerable detail with particular reference to certain preferred embodiments thereof, but it will be understood that variations and modifications can be effected with the spirit and scope of the invention as described hereinabove, and as defined in the appended claims.

We claim:

1. An image forming article of manufacture comprising at least one gelatin layer, the gelatin of which has a jelly strength of at least 150 g. bloom and contains at least 0.5%, based on the weight of the gelatin, of a hardener selected from the group consisting of the dialdehydes, the aldehyde groups of which are joined by a linear carbon chain of 2–3 carbon atoms and the bisulfite derivatives thereof.

2. A silver salt-sensitized photographic material comprising at least one layer of gelatin having a jelly strength of at least 150 g. bloom which contains at least 0.5%, based on the weight of the gelatin, of a hardener selected from the group consisting of the dialdehydes, the aldehyde groups of which are joined by a linear carbon chain of 2–3 carbon atoms and the bisulfite derivatives thereof.

3. A gelatin-silver halide photographic emulsion, the gelatin of which has a jelly strength of at least 150 g. bloom, which emulsion contains 0.5%, based on the weight of the gelatin, of a hardener selected from the group consisting of the dialdehydes, the aldehyde groups of which are joined by a linear carbon chain of 2–3 carbon atoms and the bisulfite derivatives thereof.

4. A gelatin-silver halide photographic emulsion, the gelatin of which has a jelly strength of at least 150 g. bloom containing at least 0.5%, based on the weight of gelatin, of beta-methyl glutaraldehyde.

5. A gelatin-silver halide photographic emulsion, the gelatin of which has a jelly strength of at least 150 g. bloom containing at least 0.5%, based on the weight of the gelatin, of maleic dialdehyde.

6. A gelatin-silver halide photographic emulsion, the gelatin of which has a jelly strength of at least 150 g. bloom containing at least 0.5%, based on the weight of the gelatin, of succinic dialdehyde.

7. A gelatin-silver halide photographic emulsion, the gelatin of which has a jelly strength of at least 150 g. bloom containing at least 0.5%, based on the weight of the gelatin, of succinaldehyde sodium bisulfite.

8. A gelatin-silver halide photographic emulsion, the gelatin of which has a jelly strength of at least 150 g. bloom containing at least 0.5%, based on the weight of the gelatin, of glutaraldehyde sodium bisulfite.

9. The process of preparing a hardened gelatin photographic emulsion layer which comprises forming a coating of a substantially unhardened gelatin photographic emulsion having at least 0.5%, based on the weight of the gelatin, of succinaldehyde bis-sodium bisulfite addition product therein and subsequently developing the emulsion in an alkaline photographic developer solution.

10. The process of preparing a hardened gelatin photographic emulsion layer which comprises forming a coating of a substantially unhardened gelatin photographic emulsion having at least 0.5%, based on the weight of the gelatin, of glutaraldehyde bis-sodium bisulfite addition product therein and subsequently developing the emulsion in an alkaline photographic developer solution.

11. A gelatin-silver halide photographic emulsion, the gelatin of which has a jelly strength of at least 150 g. bloom containing at least 0.5%, based on the weight of the gelatin, of a bisulfite derivative of a dialdehyde, the aldehyde groups of which are separated by a chain of 3 carbon atoms.

No references cited.

NORMAN G. TORCHIN, *Primary Examiner.*

Disclaimer 3,232,764.—*Charles F. H. Allen* and *Donald M. Burness*, Rochester, N.Y. GELATIN COMPOSITIONS ADAPTED FOR THE PREPARATION OF HARDENED COATINGS. Patent dated Feb. 1, 1966. Disclaimer filed May 15, 1969, by the assignee, *Eastman Kodak Company*.

Hereby enters this disclaimer to claims 1, 2, 3, 6 and 11 of said patent.
[*Official Gazette October 14, 1969.*]